(12) United States Patent
Masada et al.

(10) Patent No.: US 10,259,963 B2
(45) Date of Patent: Apr. 16, 2019

(54) AQUEOUS INK, INK CARTRIDGE AND INK JET RECORDING METHOD

(71) Applicant: CANON KABUSHIKI KAISHA, Tokyo (JP)

(72) Inventors: Aiko Masada, Tokyo (JP); Kenichi Shiiba, Warabi (JP); Yuki Nishino, Inagi (JP); Kenji Moribe, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/912,911

(22) Filed: Mar. 6, 2018

(65) Prior Publication Data
US 2018/0258302 A1 Sep. 13, 2018

(30) Foreign Application Priority Data
Mar. 10, 2017 (JP) .................. 2017-045713

(51) Int. Cl.
| | |
|---|---|
| *B41M 5/00* | (2006.01) |
| *B41J 2/175* | (2006.01) |
| *B41J 29/02* | (2006.01) |
| *C09D 11/38* | (2014.01) |
| *C09D 11/033* | (2014.01) |
| *C09D 11/037* | (2014.01) |
| *C09D 11/102* | (2014.01) |
| *C09D 11/322* | (2014.01) |
| *C09D 11/326* | (2014.01) |

(52) U.S. Cl.
CPC ............. *C09D 11/38* (2013.01); *B41J 2/1752* (2013.01); *B41J 2/1753* (2013.01); *B41J 2/17513* (2013.01); *B41J 2/17553* (2013.01); *B41J 29/02* (2013.01); *B41M 5/0023* (2013.01); *C09D 11/033* (2013.01); *C09D 11/037* (2013.01); *C09D 11/102* (2013.01); *C09D 11/322* (2013.01); *C09D 11/326* (2013.01)

(58) Field of Classification Search
CPC ..... C09D 11/38; C09D 11/326; C09D 11/033; C09D 11/102; C09D 11/322; C09D 11/037; B41M 5/0023; B41J 2/2107
See application file for complete search history.

(56) References Cited

U.S. PATENT DOCUMENTS

| | | | |
|---|---|---|---|
| 9,452,608 | B2 | 9/2016 | Okamura et al. |
| 2011/0160358 | A1* | 6/2011 | Arai ............... C09B 67/0041 524/90 |

(Continued)

FOREIGN PATENT DOCUMENTS

| | | |
|---|---|---|
| JP | H10-219166 A | 8/1998 |
| JP | 2010-180316 A | 8/2010 |
| JP | 2016-044237 A | 4/2016 |

*Primary Examiner* — Julian D Huffman
(74) *Attorney, Agent, or Firm* — Venable LLP

(57) ABSTRACT

To provide an aqueous ink that can suppress the dissolution of silicon or a silicon compound contained in a recording head, can be stably, continuously ejected for a long time, and enables the recording of an image having excellent glossiness. An aqueous ink for ink jet includes a pigment, a resin dispersant for dispersing the pigment, an alkanolamine and a urethane resin. The pigment is a solid solution containing C.I. Pigment Red 122 and C.I. Pigment Violet 19, and the proportion (% by mass) of the C.I. Pigment Red 122 is 10% by mass or more to 90% by mass or less based on the total mass of the solid solution.

10 Claims, 3 Drawing Sheets

(56) References Cited

U.S. PATENT DOCUMENTS

| | | | |
|---|---|---|---|
| 2011/0292113 A1* | 12/2011 | Nagase | C08G 18/0823 347/20 |
| 2011/0300344 A1* | 12/2011 | Tateishi | C09D 11/322 428/195.1 |
| 2012/0128949 A1* | 5/2012 | Goto | B41M 5/0017 428/207 |
| 2013/0101814 A1* | 4/2013 | Gotou | B41M 5/0017 428/207 |
| 2013/0143008 A1* | 6/2013 | Gotou | B41M 5/0017 428/195.1 |
| 2013/0202862 A1* | 8/2013 | Hasegawa | C09D 11/30 428/211.1 |
| 2014/0002539 A1* | 1/2014 | Goto | C09D 11/322 347/20 |
| 2014/0192120 A1* | 7/2014 | Nozawa | B41M 5/502 347/100 |
| 2014/0204156 A1* | 7/2014 | Gotou | B41J 2/01 347/100 |
| 2016/0075898 A1* | 3/2016 | Imai | C09D 11/54 347/21 |
| 2016/0075899 A1* | 3/2016 | Imai | C09D 11/322 347/20 |
| 2017/0022381 A1* | 1/2017 | Takamura | C09D 11/54 |
| 2018/0127610 A1* | 5/2018 | Kido | C09D 11/102 |
| 2018/0170061 A1* | 6/2018 | Nakamura | B41J 2/16552 |
| 2018/0326770 A1* | 11/2018 | Willems | B41M 5/0017 |

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

An ink jet recording method uses four types of inks including three primary color inks of yellow, magenta and cyan inks and a black ink in combination to record full color images. In order to improve the toughness of images recorded by the ink jet recording method, an ink containing a pigment as a coloring material (hereinafter also called "pigment ink") is widely used.

In recent years, the ink jet recording method can produce recorded products having higher image quality, and is required to output recorded products having excellent image quality substantially equal to silver halide photographs. For example, the glossiness of an image recorded with a pigment ink on a recording medium such as glossy paper is likely to deteriorate. On this account, the method is required to record images in a wide color reproduction range while suppressing the deterioration of the glossiness.

As the pigment used in a magenta ink for ink jet, a solid solution pigment including two or more quinacridone compounds has been disclosed (Japanese Patent Application Laid-Open No. H10-219166). It is disclosed that use of the solid solution pigment enables the recording of an image having a color phase similar to the magenta color used for offset printing or to the magenta color of a dye ink for ink jet. In order to record an image having excellent glossiness and having a wider color reproducibility in a red region, an ink containing a solid solution of quinacridone pigments having a specified particle size distribution has been disclosed (Japanese Patent Application Laid-Open No. 2010-180316). In order to suppress beading and to record an image having excellent glossiness, a pigment ink containing a urethane resin, a surfactant and an organic amine has been disclosed (Japanese Patent Application Laid-Open No. 2016-44237)

SUMMARY OF THE INVENTION

Studies by the inventors of the present invention have revealed that it is difficult to record images having a high level of glossiness recently required even by using an ink containing the solid solution pigment disclosed in Japanese Patent Application Laid-Open No. H10-219166 or the ink disclosed in Japanese Patent Application Laid-Open No. 2010-180316. It is revealed that use of the ink disclosed in Japanese Patent Application Laid-Open No. 2016-44237 enables the recording of images having good glossiness. It is, however, also revealed that the ink may not be normally ejected under particular conditions.

The present invention is intended to provide an aqueous ink that can be stably, continuously ejected for a long time and enables the recording of an image having excellent glossiness. The present invention is also intended to provide an ink cartridge including the aqueous ink and an ink jet recording method.

The above objects are achieved by the following present invention. In other words, the present invention provides an aqueous ink for ink jet including a pigment, a resin dispersant for dispersing the pigment, an alkanolamine and a urethane resin. In the aqueous ink for ink jet, the pigment is a solid solution including C.I. Pigment Red 122 and C.I. Pigment Violet 19, and in the solid solution, a proportion (% by mass) of the C.I. Pigment Red 122 is 10% by mass or more to 90% by mass or less based on a total mass of the solid solution.

According to the present invention, an aqueous ink that can be stably, continuously ejected for a long time and enables the recording of an image having excellent glossiness can be provided. According to the present invention, an ink cartridge including the aqueous ink and an ink jet recording method can also be provided.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
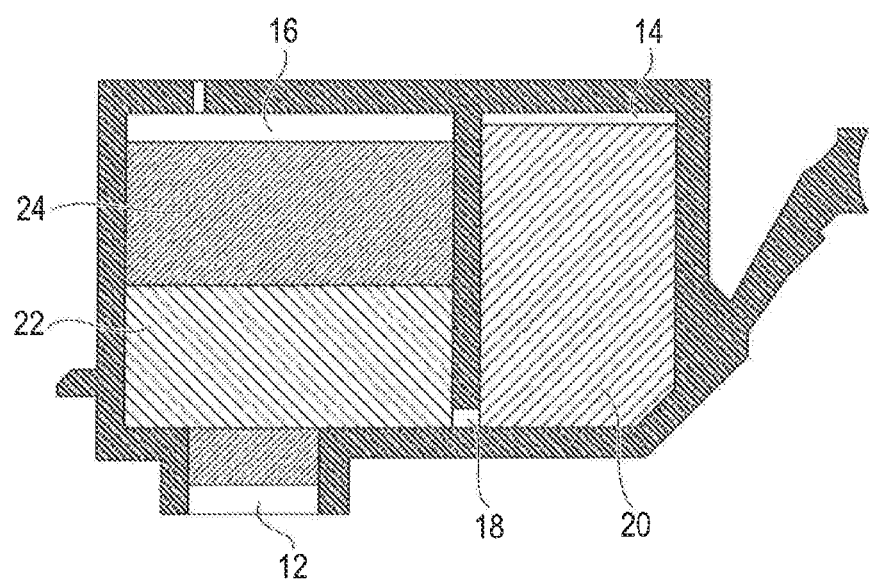
FIG. 1 is a schematic sectional view showing an embodiment of an ink cartridge of the present invention.

Preferred embodiments of the present invention will now be described in detail in accordance with the accompanying drawings.

The present invention will now be described in detail with reference to preferred embodiments. In the present invention, when a compound is a salt, the salt dissociates into ions in an ink, but such a case is expressed as "containing a salt" for convenience. An aqueous ink for ink jet may be simply called "ink". A solid solution of a plurality of pigments may be simply called "pigment". Physical property values are values determined at normal temperature (25° C.) unless otherwise noted. The "unit" in a resin means a repeating unit derived from a single monomer.

An ink jet recording head includes a member (a nozzle plate, for example) containing silicon or a silicon compound (hereinafter expressed as silicons), such as a silicon substrate, regardless of the generation system of ejection energy. Such a recording head has ink supply ports as penetration ports formed in the substrate. The penetration ports as the ink supply ports are formed, for example, by sandblasting, laser processing, dry or wet etching, anisotropic etching or processing in combination therewith.

The inventors of the present invention have studied the reason of failing in normal ejection under the above particular conditions, and have revealed the following mechanisms. When an ink is used for a long time and is in contact with a recording head for a long time, silicons may dissolve at the edge of an ink supply port, for example. It is supposed that when the dissolution of silicons proceeds, the ink erodes the ink supply port from the position at which the silicons have dissolved and comes into contact with electric wiring of the recording head to be likely to break the wiring. As a result, the ink is not normally ejected.

The inventors of the present invention have studied the constitution of an ink capable of suppressing the dissolution of silicons contained in a recording head and enabling the recording of an image having excellent glossiness even in conditions of multipath recording or the like that is likely to reduce the glossiness. The multipath recording is typically used in a serial type ink jet recording apparatus and is a recording system in which an image in a unit region on a recording medium is formed step-by-step by a plurality of times of record scanning. The surface of a recording medium such as glossy paper has fine pores for improving the absorption of a liquid component contained in an ink or improving the fixation of a coloring material. In an aqueous ink containing a pigment, pigment particles are dispersed in an aqueous medium. The pigment has a larger particle diameter than the pore diameter on the surface of a recording medium, and thus the pigment deposited on the surface of a recording medium is fixed. This impairs the surface smoothness of the recording medium, and the glossiness of the image is likely to deteriorate. In the multipath recording, the ink layers overlap with each other, thus the surface of a recording medium has a larger unevenness, and the glossiness of an image is more likely to deteriorate.

In order to record an intended image having excellent glossiness by the multipath recording, the studies have revealed that addition of an alkanolamine and a urethane resin to an ink is effective. When the urethane resin is added to an ink, the formed pigment layer has a higher surface energy to obtain a higher wettability with an ink subsequently applied. Hence, a plurality of ink dots are likely to connect with each other, and thus the pigment layer can have a smooth surface. When the alkanolamine is further added, the urethane resin can be prevented from aggregating, and thus the pigment layer can have a smoother surface. As a result, it is supposed that an image having an intended high level of glossiness can be recorded.

Meanwhile, it is revealed that when the alkanolamine is added to an ink, silicons contained in a recording head is likely to be dissolved. An ink containing the alkanolamine has a high pH, and silicons are likely to be dissolved at a high pH. It is assumed that when a hydroxide ion in an ink reacts with crystals of silicons to cut interatomic bonds, and a resulting degradation product is dissolved into the ink.

Further studies by the inventors of the present invention have revealed that when the solid solution shown below is used as the pigment and a urethane resin is contained, the dissolution of silicons contained in a recording head can be suppressed.
[Solid solution]: containing C.I. Pigment Red 122 and C.I. Pigment Violet 19; and in the solid solution, the proportion (% by mass) of the C.I. Pigment Red 122 is 10% by mass or more to 90% by mass or less based on the total mass of the solid solution.

The arrangement of the solid solution of quinacridones is deformed in the crystal formation, and thus hydrophobic crystal faces are dispersed in the quinacridone solid solution as compared with a pigment of a single quinacridone. As a result, a resin dispersant is unlikely to adsorb to the particle surface of the pigment (solid solution), and the particle surface of the pigment is likely to be exposed. In addition, in a solid solution containing C.I. Pigment Violet 19 that is an unsubstituted quinacridone and C.I. Pigment Red 122 that is a quinacridone having a methyl group, the methyl group of the C.I. Pigment Red 122 is exposed on the particle surface of the pigment at a higher rate. It is supposed that the methyl group of the C.I. Pigment Red 122 is present on the exposed particle surface of the pigment, and thus the hydrophobic interaction accelerates the adsorption to silicons. When the proportion of C.I. Pigment Red 122 is less than 10% by mass in a solid solution, the methyl group of the C.I. Pigment Red 122 is exposed on the particle surface of a pigment (solid solution) at a higher rate, and this makes it difficult to suppress the dissolution of silicons. When the proportion of C.I. Pigment Red 122 is more than 90% by mass in a solid solution, the proportion is substantially equal to that of the pigment containing only C.I. Pigment Red 122, thus the arrangement is insufficiently deformed in the crystal formation, and this makes it difficult to suppress the dissolution of silicons.

The hydrophobic moiety of a urethane resin adsorbs to the exposed particle surface of a pigment and to silicons in a crosslinking manner due to hydrophobic interaction. On this account, it is supposed that the adsorption of the exposed particle surface of a pigment to the silicons is further accelerated, and the dissolution of the silicons is suppressed. In addition, it is supposed that the urethane resin itself adsorbs to the silicons due to hydrophobic interaction, and thus the dissolution of the silicons is suppressed.

<Ink>

The ink of the present invention is an aqueous ink for ink jet containing a pigment, a resin dispersant for dispersing the pigment, an alkanolamine and a urethane resin. Components contained in the ink of the present invention and the like will next be described in detail.

(Pigment)

The pigment used in the ink of the present invention is a solid solution containing C.I. Pigment Red 122 and C.I. Pigment Violet 19. The C.I. Pigment Red 122 is 2,9-dimethylquinacridone, and the C.I. Pigment Violet 19 is the unsubstituted quinacridone. In the present invention, the "solid solution" means a pigment present as a mixed crystal of two or more pigment molecules (crystallized in a mixture state) and differs from a simple mixture of two or more pigments.

In the solid solution, the proportion (% by mass) of the C.I. Pigment Red 122 is required to be 10% by mass or more to 90% by mass or less based on the total mass of the solid solution. When the proportion is out of the range, the dissolution of the silicons contained in a recording head cannot be suppressed. In the solid solution, the proportion (% by mass) of the C.I. Pigment Red 122 is preferably 10% by mass or more to 45% by mass or less based on the total mass of the solid solution. When the proportion of the C.I. Pigment Red 122 is 45% by mass or less in the solid solution, the methyl group of the C.I. Pigment Red 122 is more efficiently exposed on the particle surface of the pigment. As a result, the dissolution of the silicons contained in a recording head can be further suppressed.

The solid solution may further contain an "additional pigment" other than the C.I. Pigment Violet 19 and the C.I. Pigment Red 122. Examples of the "additional pigment" include quinacridone pigments such as C.I. Pigment Orange 48, C.I. Pigment Orange 49, C.I. Pigment Red 192, C.I. Pigment Red 202, C.I. Pigment Red 206, C.I. Pigment Red 207 and C.I. Pigment Red 209. When a solid solution containing an additional pigment is used, the proportion (% by mass) of the additional pigment in the solid solution is preferably 1% by mass or more to 10% by mass or less based on the total mass of the solid solution.

The content (% by mass) of the pigment in the ink is preferably 0.1% by mass or more to 10.0% by mass or less and more preferably 1.0% by mass or more to 10.0% by mass or less based on the total mass of the ink. Specifically, the content is particularly preferably 2.0% by mass or more to 8.0% by mass or less. For the purpose of toning or the like, a dye may be used in combination as the coloring material.

(Resin Dispersant)

The ink of the present invention contains a resin dispersant for dispersing the pigment in the ink. In other words, the ink of the present invention contains a resin-dispersed pigment. When only a self-dispersible pigment in which a hydrophilic functional group is bonded to the particle surface of the pigment is used in place of the resin-dispersed pigment, an excess charge amount prevents the solid solution from adhering to silicons, and this makes it difficult to suppress the dissolution of silicons. The dispersion manner of a pigment in an ink can be determined by the following method. To the pigment separated from an ink by an appropriate method, an excess amount of an acid is added to precipitate the pigment. A pigment redispersible in an aqueous medium can be determined to be a self-dispersible pigment, and a pigment failing to be redispersed can be determined to be a resin-dispersed pigment.

The resin dispersant is preferably a resin having a hydrophilic unit and a hydrophobic unit as constitutional units. The resin dispersant is preferably an acrylic resin at least having an acrylic component such as a unit derived from (meth)acrylic acid and a unit derived from a (meth)acrylic ester, and more preferably a water-soluble acrylic resin. The "water-soluble acrylic resin" means a resin that can be dissolved in an aqueous medium as a mixed solvent of water and a water-soluble organic solvent and can be present in an aqueous medium in the form with no particle diameter when subjected to dynamic light scattering. Whether an acrylic resin is water-soluble or not can be specifically determined by the same procedure as in the case of the water-soluble urethane resin described later. In the below description, "(meth)acrylic" means "acrylic" and "methacrylic", and "(meth)acrylate" means "acrylate" and "methacrylate".

The hydrophilic unit is a unit having a hydrophilic group such as an acid group and a hydroxy group. The hydrophilic unit can be formed by polymerization of a monomer having a hydrophilic group, for example. Specific examples of the monomer having a hydrophilic group include anionic monomers including acidic monomers having a carboxy group, such as (meth)acrylic acid, itaconic acid, maleic acid and fumaric acid and anhydrides and salts of these acidic monomers; monomers having a hydroxy group, such as 2-hydroxyethyl (meth)acrylate and 3-hydroxypropyl (meth)acrylate; and monomers having an ethylene oxide group, such as methoxy(mono, di, tri, poly)ethylene glycol (meth)acrylates. Examples of the cation constituting the salt of an anionic monomer include a lithium ion, a sodium ion, a potassium ion, an ammonium ion and organic ammonium ions.

The resin dispersant is preferably a resin having an acid value. On this account, a resin containing a unit derived from the above anionic monomer as the hydrophilic unit is preferably used. The resin dispersant typically exhibits water-solubility when neutralized with a neutralizer such as hydroxides of alkali metals (for example, lithium, sodium and potassium) and aqueous ammonia.

The hydrophobic unit is a unit having no hydrophilic group such as an acid group and a hydroxy group. The hydrophobic unit can be formed by polymerization of a monomer having a hydrophobic group, for example. Specific examples of the monomer having a hydrophobic group include monomers having an aromatic ring, such as styrene, α-methylstyrene and benzyl (meth)acrylate; and monomers having an aliphatic group, such as ethyl (meth)acrylate, methyl (meth)acrylate, (iso)propyl (meth)acrylate, (n-, iso-, t-)butyl (meth)acrylates and 2-ethylhexyl (meth)acrylate.

The content (% by mass) of the resin dispersant in the ink is preferably 0.1% by mass or more to 10.0% by mass or less and more preferably 0.2% by mass or more to 4.0% by mass or less based on the total mass of the ink.

(Urethane Resin)

The ink of the present invention contains a urethane resin. Preferably, a water-soluble urethane resin is used. In the present invention, the "water-soluble urethane resin" means a urethane resin that can be dissolved in an aqueous medium as a mixed solvent of water and a water-soluble organic solvent and can be present in an aqueous medium in the form with no particle diameter when subjected to dynamic light scattering.

Whether a urethane resin is water-soluble or not can be determined by the following procedure. First, a liquid containing a resin (resin solid content: 10% by mass) neutralized with an alkali (such as sodium hydroxide and potassium hydroxide) in an amount corresponding to the acid value is prepared. Next, the prepared liquid is diluted 10-fold (in terms of volume) with pure water to prepare a sample solution. The particle diameter of the resin in the sample solution is then determined by dynamic light scattering. When particles having particle diameters are not observed, such a resin can be determined to be water-soluble. The conditions for the measurement can be as follows.

[Measurement Conditions]
SetZero: 30 seconds
Number of measurement times: 3
Measurement time: 180 seconds As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions and the like are not limited to the above.

The urethane resin used in the ink of the present invention preferably has a unit derived from a polyisocyanate, a unit derived from a polyol having no acid group and a unit derived from a polyol having an acid group. The "unit" in the urethane resin in the present invention means a repeating unit derived from a single monomer. Monomers constituting the units included in the urethane resin will next be described.

[Polyisocyanate]

A polyisocyanate is the compound having two or more isocyanate groups in the molecular structure thereof. Examples of the polyisocyanate include aliphatic polyisocyanates and aromatic polyisocyanates. The proportion of the unit derived from a polyisocyanate relative to the urethane resin (% by mole) is preferably 10.0% by mole or more to 80.0% by mole or less and more preferably 20.0% by mole or more to 60.0% by mole or less. The proportion of the unit derived from a polyisocyanate relative to the urethane resin (% by mass) is preferably 10.0% by mass or more to 80.0% by mass or less.

Examples of the aliphatic polyisocyanate include polyisocyanates having a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane-1,5-diisocyanate and 3-methylpentane-1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate and 1,3-bis(isocyanate methyl) cyclohexane.

Examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate and α,α,α',α'-tetramethylxylylene diisocyanate.

The polyisocyanate is preferably isophorone diisocyanate. By using the urethane resin having the unit derived from isophorone diisocyanate, the dissolution of silicons can be further suppressed. It is supposed that the unit derived from isophorone diisocyanate has high hydrophobicity and is likely to adsorb to the exposed particle surface of a pigment or to silicons, and thus the dissolution of silicons can be further suppressed.

[Polyol, Polyamine]

A polyol is the compound having two or more hydroxy groups in the molecular structure thereof. Examples of the polyol include polyols having no acid group, such as polyether polyols, polyester polyols and polycarbonate polyols; and polyols having an acid group. A polyamine is the compound having two or more "amino groups or imino groups" in the molecular structure thereof. The proportion of the units derived from a polyol and a polyamine (% by mole) relative to the urethane resin is preferably 10.0% by mole or more to 80.0% by mole or less and more preferably 20.0% by mole or more to 60.0% by mole or less.

[Polyol Having No Acid Group]

Examples of the polyether polyol include addition polymers of an alkylene oxide and a polyol; and glycols such as (poly)alkylene glycols. Examples of the alkylene oxide include ethylene oxide, propylene oxide, butylene oxide and α-olefin oxides. Examples of the polyol to be subjected to addition polymerization with an alkylene oxide include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea and derivatives thereof: and triols such as glycerol, trimethylolpropane, 1,2,5-hexanetriol, 1,2,6-hexanetriol, pentaerythritol, trimethylolmelamine and derivatives thereof and polyoxypropylene triol. Examples of the glycol include (poly)alkylene glycols such as tetramethylene glycol, hexamethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol and neopentyl glycol; and ethylene glycol-propylene glycol copolymers.

Examples of the polyester polyol include acid esters. Examples of the acid component constituting the acid esters include aromatic dicarboxylic acids such as phthalic acid, naphthalenedicarboxylic acid, biphenyldicarboxylic acid and tetrahydrophthalic acid; alicyclic dicarboxylic acids such as hydrogenated products of these aromatic dicarboxylic acids; and aliphatic dicarboxylic acids such as malonic acid, succinic acid, tartaric acid, oxalic acid, glutaric acid, adipic acid, pimelic acid, suberic acid, azelaic acid, sebacic acid, alkylsuccinic acids, linoleic acid, maleic acid, fumaric acid, mesaconic acid, citraconic acid and itaconic acid. Anhydrides, salts and derivatives (including alkyl esters and acid halides) thereof are also usable as the acid component, for example. Examples of the component to form an ester with the acid component include polyols such as diols and triols; and glycols such as (poly)alkylene glycols. Examples of the polyols and the glycols include those exemplified as the components constituting the above polyether polyol.

As the polycarbonate polyol, a polycarbonate polyol produced by a known method can be used. Specific examples include alkane diol-type polycarbonate diols such as polyhexamethylene carbonate diol. Other examples include polycarbonate diols prepared by reacting a carbonate component such as alkylene carbonates, diaryl carbonates and dialkyl carbonates or phosgene with an aliphatic diol component.

The polyol having no acid group is preferably a polypropylene glycol. By using the urethane resin having the unit derived from a polypropylene glycol, the dissolution of silicons can be further suppressed. The polypropylene glycol has a branched structure having a methyl group on a side chain. On this account, the unit derived from a polypropylene glycol is likely to interact with and to adsorb to the exposed particle surface of a pigment or silicons. It is thus supposed that the dissolution of silicons can be further suppressed.

In the urethane resin, the proportion of the unit derived from a polyol having no acid group (% by mole) relative to the total amount of the unit derived from a polyol is preferably within the following range. In other words, the proportion is preferably 5.0% by mole or more to 50.0% by mole or less and more preferably 10.0% by mole or more to 30.0% by mole or less. In the urethane resin, the proportion of the unit derived from a polyol having no acid group (% by mass) is preferably 5.0% by mass or more to 60.0% by mass or less.

[Polyol Having an Acid Group]

Examples of the polyol having an acid group include polyols having an acid group such as a carboxylic acid group, a sulfonic acid group, a phosphoric acid group and a phosphonic acid group. The acid group is preferably a carboxylic acid group. Examples of the polyol having a carboxylic acid group include dimethylolacetic acid, dimethylolpropionic acid, dimethylolbutanoic acid and dimethylolbutyric acid. Of them, dimethylolpropionic acid and dimethylolbutanoic acid are preferred. The acid group of the polyol having an acid group may be in a salt form. Examples of the cation forming a salt include ions of alkali metals such as lithium, sodium and potassium, an ammonium ion and cations of organic amines such as dimethylamine. The molecular weight of a general-purpose polyol having an acid group is at most about 400, and thus the unit derived from a polyol having an acid group basically constitutes a hard segment of a urethane resin. The acid group in the urethane resin is mainly derived from the acid group of the unit derived from a polyol having an acid group. The acid value of a urethane resin can be controlled by the amount of a polyol having an acid group.

In the urethane resin, the proportion of the unit derived from a polyol having an acid group (% by mole) relative to the total amount of the unit derived from a polyol is preferably within the following range. In other words, the proportion is preferably 30.0% by mole or more to 90.0% by mole or less and more preferably 50.0% by mole or more to 90.0% by mole or less.

[Polyamine]

Examples of the polyamine include monoamines having a plurality of hydroxy groups, such as dimethylolethylamine, diethanolmethylamine, dipropanolethylamine and dibutanolmethylamine; bifunctional polyamines such as ethylenediamine, propylenediamine, hexylenediamine, isophoronediamine, xylylenediamine, diphenylmethanediamine, hydrogenated diphenylmethane diamine and hydrazine; and three or more functional polyamines such as diethylenetriamine, triethylenetetramine, tetraethylenepentamine, polyamide polyamine and polyethylene polyimine. For convenience, compounds having a plurality of hydroxy groups and a single "amino group or imino group" are also exemplified as the "polyamine". The molecular weight of a polyamine is at most about 400, and thus the unit derived from a polyamine basically constitutes a hard segment of a urethane resin. The proportion of the unit derived from a polyamine (% by mole) relative to the urethane resin is preferably 10.0% by mole or less and more preferably 5.0% by mole or less. The proportion of the unit derived from a polyamine (% by mole) relative to the urethane resin may be 0.0% by mole.

[Crosslinking Agent, Chain Extender]

To synthesize the urethane resin, a crosslinking agent or a chain extender can be used. Typically, the crosslinking agent is used to synthesize a prepolymer, and the chain extender is used when a previously synthesized prepolymer is subjected to a chain extension reaction. Basically, the crosslinking agent and the chain extender can be appropriately selected from water, polyisocyanates, polyols, polyamines and the like depending on a purpose such as crosslinking and chain extension. As the chain extender, an agent capable of crosslinking a urethane resin can also be used.

[Characteristics]

In the urethane resin, the proportion of a unit derived from the polyol having an acid group present at the molecular terminal relative to the whole unit derived from the polyol having an acid group is preferably 30% or less. The proportion is based on mole (i.e., % by mole). By using such a urethane resin, the dissolution of silicons can be further suppressed. It is supposed that a urethane resin having a smaller proportion of the unit derived from the polyol having an acid group present at the molecular terminal has a comparatively small hydrophilicity at the molecular terminal and thus is likely to adsorb to the exposed particle surface of a pigment or silicons. The lower limit of the proportion is 0% or more.

The proportion of the urethane bond relative to the total amount of the urethane bond and the urea bond in the urethane resin is preferably 85.0% by mole or more. When the proportion of the urethane bond is less than 85.0% by mole, the ink is likely to deposit around ejection orifices, and the ejection stability at the time of recording may be slightly reduced. The upper limit of the proportion is 100.0% or less and is preferably 98.5% or less.

The urethane resin preferably has an acid value of 30 mg KOH/g or more to 100 mg KOH/g or less. The urethane resin preferably has a weight-average molecular weight of 5,000 or more to 20,000 or less.

The content (% by mass) of the urethane resin in the ink is preferably 0.1% by mass or more to 10.0% by mass or less and more preferably 0.5% by mass or more to 3.0% by mass or less based on the total mass of the ink. The content (% by mass) of the urethane resin in the ink relative to the content (% by mass) of the pigment in terms of mass ratio is preferably 0.10 times or more to 1.00 times or less. When the mass ratio is less than 0.10 times, the effect of improving the wettability with an ink subsequently applied may be reduced. As a result, the surface smoothness of the formed pigment layer is not sufficiently improved, and the effect of improving image glossiness may be slightly reduced. When the mass ratio is more than 1.00 time, the resin amount in a pigment layer increases, and thus the color developability of an image is likely to be reduced.

[Analytical Method]

(1) The formulation; (2) the proportion of the unit derived from the polyol having an acid group present at the molecular terminal relative to the whole unit derived from the polyol having an acid group; and (3) the proportion of the urethane bond relative to the total amount of the urethane bond and the urea bond of the urethane resin in an ink can be analyzed by the respective methods shown below.

The formulation of a urethane resin can be analyzed by the following method. First, a method of extracting the urethane resin from an ink containing a urethane resin will be described. For example, to a supernatant liquid prepared by centrifugation of an ink at 80,000 rpm, an excess amount of an acid (hydrochloric acid, for example) is added to precipitate a resin. Alternatively, a urethane resin may be separated by drying the above supernatant liquid. Alternatively, an organic solvent that does not dissolve a pigment or an acrylic resin but dissolves a urethane resin (hexane or chloroform, for example) can be used to extract the urethane resin from an ink. Although the urethane resin present in an ink can be analyzed, analysis of the urethane resin extracted from an ink can improve the measurement accuracy, and thus the extraction is preferred.

The separated urethane resin is dried and then dissolved in deuterated dimethyl sulfoxide (deuterated DMSO) to give a sample for measurement. The prepared measurement sample is analyzed by proton nuclear magnetic resonance method ($^1$H-NMR), and from the positions of obtained peaks, the types of a polyisocyanate, a polyol having no acid group, a polyol having an acid group and the like can be identified. From the ratio of integrated values of peaks at chemical shifts of corresponding components, the composition ratio can also be calculated. Alternatively, pyrolysis gas chromatographic analysis of a urethane resin also enables identification of the types of a polyisocyanate, a polyol having no acid group, a polyol having an acid group and the like. In addition, by the analysis by carbon nuclear magnetic resonance method ($^{13}$C-NMR), the repetition number of units derived from a polyol is determined, and the number-average molecular weight can be calculated.

In the urethane resin, the proportion of the unit derived from the polyol having an acid group present at the molecular terminal relative to the whole unit derived from the polyol having an acid group can be analyzed by the following method. First, the urethane resin extracted from an ink by the above method is analyzed by pyrolysis gas chromatography to identify the types of a polyisocyanate, a polyol having no acid group and a polyol having an acid group. Next, a reaction product of the identified polyisocyanate and the polyol having an acid group is dissolved in deuterated DMSO and is analyzed by $^{13}$C-NMR. By the analysis, the chemical shift of the carbonyl carbon (at a lower magnetic field side) in a unit derived from the polyol having an acid group present at the molecular terminal is determined. The chemical shift of the carbonyl carbon (at a higher magnetic field side) in a unit derived from the polyol having an acid group present in the molecule is also determined.

Next, the proportion of the integrated value of the peak of the carbonyl carbon in the unit derived from the polyol having an acid group present at the molecular terminal relative to the total integrated value of the peaks of the carbonyl carbons in the unit derived from the polyol having an acid group is calculated. In this manner, in a urethane resin, the proportion of the unit derived from the polyol having an acid group present at the molecular terminal relative to the whole unit derived from the polyol having an acid group can be determined. For example, when dimethylolpropionic acid (DMPA) is used, the peak of the carbonyl carbon in a unit derived from the polyol having an acid group present at the molecular terminal is detected around 176 ppm, which may slightly vary depending on measurement conditions. The peak of the carbonyl carbon in the unit derived from the polyol having an acid group present in the molecule is detected around 175 ppm. When dimethylolbutanoic acid (DMBA) is used, the peak of the carbonyl carbon in a unit derived from the polyol having an acid group present at the molecular terminal is detected around 175 ppm. The peak of the carbonyl carbon in the unit derived from the polyol having an acid group present in the molecule is detected around 174 ppm.

In a urethane resin, the proportion of the urethane bond relative to the total amount of the urethane bond and the urea bond can be analyzed by the following method. First, the urethane resin extracted from an ink by the above method is analyzed by pyrolysis gas chromatography to identify the types of a polyisocyanate, a polyol having no acid group and a polyol having an acid group. A reaction product of the identified polyisocyanate and the polyol having an acid group and a reaction product of the polyisocyanate and the polyol having no acid group are separately prepared. Each solution of the prepared reaction products in deuterated DMSO is analyzed by $^{13}$C-NMR to assign the chemical shift of the urethane bond. A reaction product of the polyisocyanate and water is also analyzed by $^{13}$C-NMR in a similar manner to assign the chemical shift of the urea bond. From the ratio of the integrated values of peaks at these chemical shifts, the proportion of the urethane bond relative to the total amount of the urethane bond and the urea bond in a urethane resin can be determined.

(Alkanolamine)

The ink of the present invention contains an alkanolamine. Examples of the alkanolamine include diethanolamine, triethanolamine and diisopropanolamine. Specifically, triethanolamine that is a tertiary amine is preferred. By using triethanolamine, the pH of an ink can be easily adjusted to a preferred range. Triethanolamine has a sufficient buffer capacity, and thus the pH of the prepared ink is unlikely to vary even after long-term storage.

The content (% by mass) of the alkanolamine in the ink is preferably 0.1% by mass or more to 5.0% by mass or less and more preferably 0.1% by mass or more to 1.0% by mass or less based on the total mass of the ink. The content (% by mass) of the alkanolamine in the ink relative to the content (% by mass) of the urethane resin in terms of mass ratio is preferably 0.05 time or more to 2.00 times or less and more preferably 0.10 times or more to 0.50 times or less. When the mass ratio is within the above range, the improvement in glossiness of images and the suppression of dissolution of silicons are likely to be in good balance.

(Aqueous Medium)

The ink of the present invention is an aqueous ink containing an aqueous medium including water. As the water, deionized water (ion-exchanged water) is preferably used. The content (% by mass) of water in the ink is preferably 10.0% by mass or more to 90.0% by mass or less and more preferably 50.0% by mass or more to 90.0% by mass or less based on the total mass of the ink.

The aqueous medium may further contain a water-soluble organic solvent. The water-soluble organic solvent may be any water-soluble solvent, and a monohydric alcohol, a polyhydric alcohol, a (poly)alkylene glycol, a glycol ether, a nitrogen-containing polar solvent, a sulfur-containing polar solvent or the like can be used. The content (% by mass) of the water-soluble organic solvent in the ink is preferably 3.0% by mass or more to 50.0% by mass or less based on the total mass of the ink.

(Other Additives)

The ink of the present invention can also contain water-soluble organic compounds that are solid at normal temperature, including polyhydric alcohols such as trimethylolpropane and trimethylolethane and urea derivatives such as urea and ethylene urea, as necessary, in addition to the above-mentioned components. The ink of the present invention may further contain various additives such as a surfactant, a pH adjuster, an anticorrosive, an antiseptic agent, an antifungal agent, an antioxidant, a reduction inhibitor, an evaporation accelerator, a chelating agent and a water-soluble resin, as needed.

(Physical Properties of Ink)

The ink preferably has a pH of 7.0 or more to 11.0 or less and more preferably 8.0 or more to 10.0 or less at 25° C. The pH of an ink can be controlled by the type and amount of an alkanolamine used. The ink preferably has a static surface tension of 30 mN/m or more to 45 mN/m or less and more preferably 35 mN/m or more to 40 mN/m or less at 25° C. The ink preferably has a viscosity of 1.0 mPa·s or more to 5.0 mPa·s or less at 25° C.

<Ink Cartridge>

An ink cartridge of the present invention includes an ink and an ink storage portion storing the ink. The ink stored in the ink storage portion is the ink of the present invention described above. FIG. 1 is a schematic sectional view showing an embodiment of the ink cartridge of the present invention. As shown in FIG. 1, the bottom face of the ink cartridge has an ink supply port 12 for supplying the ink to a recording head. The inside of the ink cartridge is an ink storage portion for storing the ink. The ink storage portion includes an ink storage chamber 14 and an absorber storage chamber 16, and the ink storage chamber 14 and the absorber storage chamber 16 communicate with each other through a communication hole 18. The absorber storage chamber 16 communicates with the ink supply port 12. The ink storage chamber 14 stores a liquid ink 20. The absorber storage chamber 16 stores absorbers 22 and 24 that are impregnated with the ink to hold the ink. The ink storage portion does not necessarily have the ink storage chamber that stores a liquid ink, and can be a portion in which all the ink stored is held by absorbers. The ink storage portion does not necessarily have absorbers, and can be a portion that stores all the ink in a liquid state. The ink storage portion may be integrated with a recording head to form an ink cartridge.

<Ink Jet Recording Method>

An ink jet recording method of the present invention is a method in which the above-described ink of the present invention is ejected from an ink jet recording head to record an image on a recording medium. The system for ejecting an ink is exemplified by a system of applying mechanical energy to an ink and a system of applying thermal energy to an ink. In the present invention, a system of applying thermal energy to an ink to eject the ink is particularly preferably adopted. The ink jet recording method can include any known steps as long as the ink of the present invention is used. By using the ink of the present invention, an image having excellent glossiness can be recorded even in conditions of multipath recording or the like that is likely to reduce the glossiness. The multipath recording is typically used in a serial type ink jet recording apparatus and is a recording system in which an image in a unit region (a pixel or a band, for example) on a recording medium is formed step-by-step by a plurality of times of record scanning.

Figure 2A:
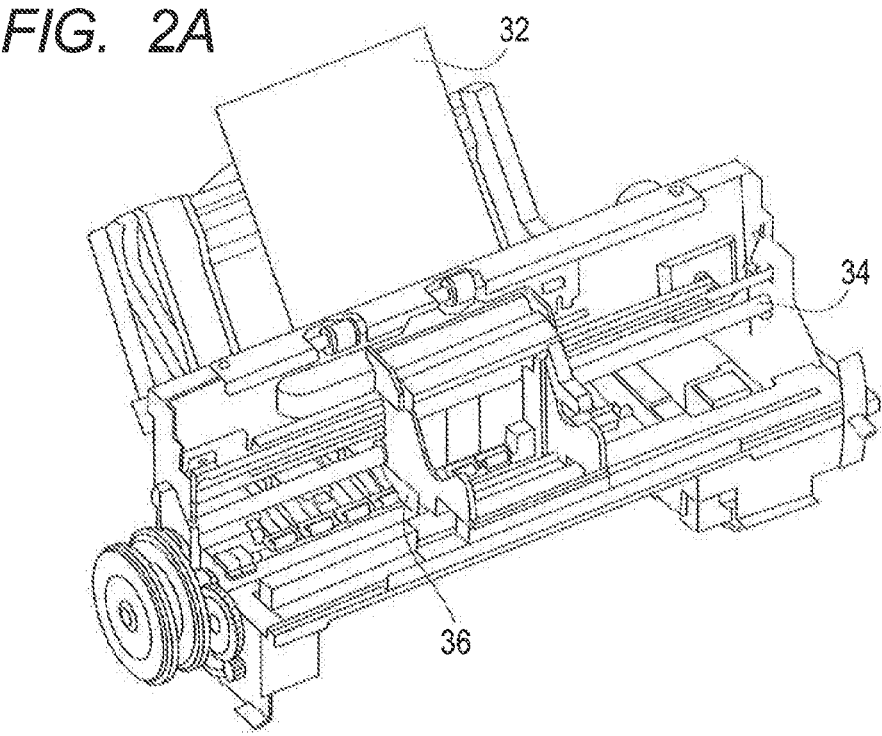
FIGS. 2A and 2B are schematic views showing an exemplary ink jet recording apparatus used for an ink jet recording method of the present invention.
Figure 2B:
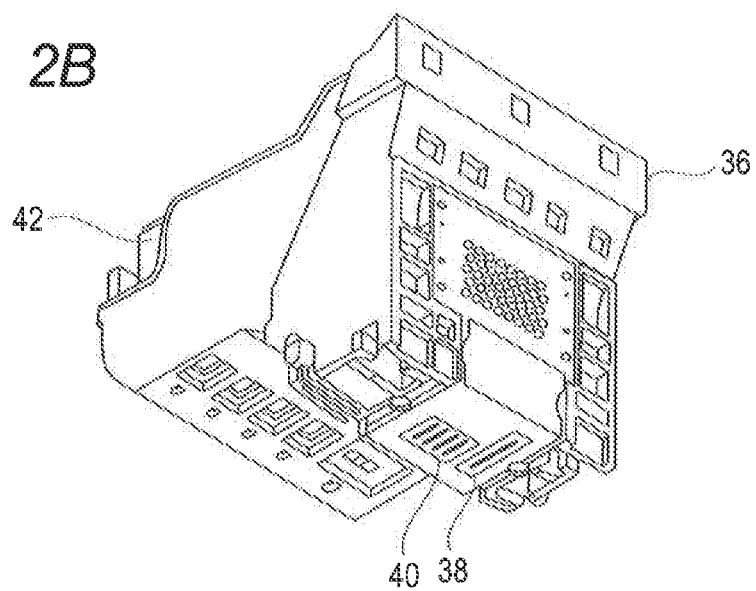

FIGS. 2A and 2B are schematic views showing an exemplary ink jet recording apparatus used for the ink jet recording method of the present invention; FIG. 2A is a perspective view of a principal part of the ink jet recording apparatus; and FIG. 2B is a perspective view of a head cartridge. The ink jet recording apparatus includes a conveyance unit (not shown) for conveying a recording medium 32 and a carriage shaft 34. On the carriage shaft 34, a head cartridge 36 can be installed. The head cartridge 36 includes recording heads 38 and 40 and is so constructed that an ink cartridge 42 can be set. Inks (not shown) are ejected toward the recording medium 32 from the recording heads 38 and 40 while the head cartridge 36 is being carried in a main scanning direction along the carriage shaft 34. The recording medium 32 is then conveyed in a sub scanning direction by a conveyance unit (not shown), whereby an image is recorded on the recording medium 32. The object recording medium to be recorded by using the ink of the present invention may be any recording medium but is preferably a paper-based recording medium having permeability, such as plain paper and recording media having a coating layer (glossy paper and art paper). Specifically, a recording medium having no coating layer, such as plain paper and a recording medium having a coating layer, such as glossy paper and art paper are preferably used.

As the recording head, a head including a member that comes into contact with an ink and at least partly includes silicon or a silicon compound is preferably used. Examples of the silicon compound include silicon nitride, silicon oxide and silicon carbide. In the recording head, constituent members including silicon or a silicon compound include a recording element substrate, an ink flow path, an orifice plate and a diaphragm as a discharge pressure generation element, for example. The recording element substrate is a member formed from a silicon substrate in which penetration ports are formed as ink supply ports. The ink supply ports can be formed in a silicon substrate, for example, by sandblasting, laser processing, dry or wet etching, anisotropic etching, or processing in combination therewith. A recording head prepared by forming a film of a silicon compound (for example, a silicon nitride film, a silicon oxide film or a silicon carbide film) on such a member can also be used, for example. A recording head prepared by forming a film of silicon or a silicon compound as the protective film for protecting an element formed on a substrate can also be used, for example.

Figure 3A:
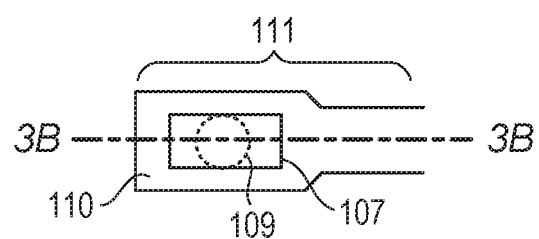
FIGS. 3A and 3B are schematic views showing an exemplary nozzle structure of a recording head.
Figure 3B:
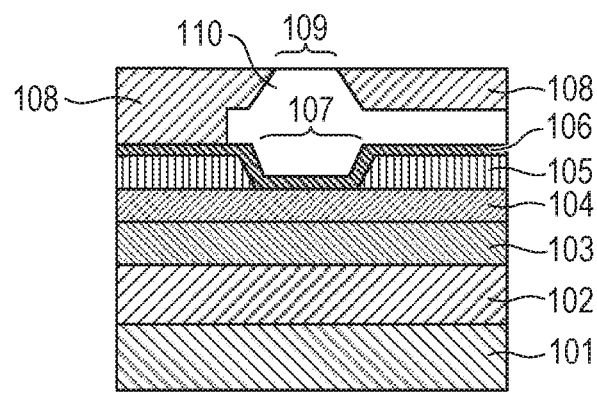

FIGS. 3A and 3B are schematic views showing an exemplary structure of a nozzle 111 of a recording head; FIG. 3A shows the nozzle shape viewed from the ejection orifice side; and FIG. 3B shows a cross section taken along the broken line X-Y in FIG. 3A. 101 is a silicon substrate, 102 is a heat storage layer, 103 is an interlaminar layer, 104 is a heat generation resistance layer, 105 is a metal wiring layer as the wiring of a metal material, and 106 is a protective layer. A heat generation portion 107 is exposed to high temperature by heat generated by the heat generation resistance and is a portion mainly affected by the impact of cavitation associated with bubble generation of an ink and subsequent shrinkage of bubbles and by chemical action by an ink. The protective layer 106 is thus provided to protect the heat generation portion 107. On the protective layer 106, a flow path forming member 108 is provided to form a layer having an ejection orifice 109 for ejecting an ink.

The protective layer 106 is a member coming into contact with an ink, and thus is required to be chemically stable, for example, against acids and alkalis, to have resistance against cavitation impact, and to have insulating properties. On this account, as the material to form the protective layer 106, a material selected from the group consisting of silicon, silicon oxide, silicon nitride and silicon carbide is typically used. However, when a liquid chamber 110 of the nozzle is filled with an ink for a long time, the protective layer 106 is also in contact with the ink for a long time, and thus the material included in the protective layer 106, such as silicon, silicon oxide, silicon nitride and silicon carbide, is gradually dissolved in the ink. When the ink of the present invention is used, the dissolution of the material included in the protective layer 106 can be suppressed.

EXAMPLES

The present invention will next be described in further detail with reference to examples, reference examples and comparative examples, but the invention is not intended to be limited to the following examples without departing from the scope of the invention. The component amounts with "part" or "%" are based on mass unless otherwise noted.

<Synthesis of Resin Dispersant>

First, 65.0 parts of styrene, 20.0 parts of butyl acrylate and 15.0 parts of acrylic acid were copolymerized in a usual manner to synthesize a resin dispersant 1 as a water-soluble acrylic resin. Separately, 85.0 parts of benzyl methacrylate and 15.0 parts of methacrylic acid were copolymerized in a usual manner to synthesize a resin dispersant 2 as a water-soluble acrylic resin. An aqueous potassium hydroxide solution in an equivalent molar amount to the acid value was added, and an appropriate amount of ion-exchanged water was added to adjust the content of the resin. In this manner, a liquid containing the resin dispersant 1 and a liquid containing the resin dispersant 2 each having a resin content (solid content) of 20.0% were prepared.

The acid values of the obtained resin dispersants (resins) were determined by the following procedure. Hydrochloric acid was added to a liquid containing a resin dispersant to precipitate the resin. The precipitated resin was dried under vacuum at 40° C. overnight and then was dissolved in tetrahydrofuran. The acid value of the resin was determined with an automatic potential-difference titrator (trade name "AT-510", manufactured by Kyoto Electronics Manufacturing) using a potassium hydroxide-methanol titration solution. The acid values of the resin dispersant 1 and the resin dispersant 2 were 120 mg KOH/g. The weight-average molecular weights of the resin dispersant 1 and the resin dispersant 2 were determined by gel permeation chromatography (GPC) to be 10,000 in terms of polystyrene.

<Preparation of Pigment>

Solid solutions prepared by the following procedure and having a primary particle diameter D of 70 nm were used as pigments. Press cakes of pigments in amounts (parts) shown in Table 1 were mixed and ground, and then the mixture was subjected to organic solvent treatment in a usual manner to form a pigment, giving pigments 1 to 9.

TABLE 1

| Preparation conditions of pigments (solid solutions) | | | | | | | | | |
|---|---|---|---|---|---|---|---|---|---|
| | Pigment | | | | | | | | |
| | 1 | 2 | 3 | 4 | 5 | 6 | 7 | 8 | 9 |
| C.I. Pigment Red 122 | 3.0 | 3.0 | 1.0 | 9.0 | 4.5 | 5.0 | | 0.5 | 9.5 |
| C.I. Pigment Violet 19 | 7.0 | 6.5 | 9.0 | 1.0 | 5.5 | 5.0 | 7.0 | 9.5 | 0.5 |
| C.I. Pigment Red 202 | | 0.5 | | | | | 3.0 | | |
| Proportion of C.I. Pigment Red 122 (%) | 30 | 30 | 10 | 90 | 45 | 50 | 0 | 5 | 95 |

<Preparation of Pigment Dispersion Liquid>

(Pigment Dispersion Liquids 1 to 15)

Components (unit: %) shown in upper rows in Table 2 were mixed to give a mixture. The obtained mixture was placed in a batch type vertical sand mill and was dispersed for 10 hours. The mixture was centrifuged to remove coarse particles and then was subjected to pressure filtration through a microfilter with a pore size of 3.0 μm (manufactured by Fujifilm Corporation). An appropriate amount of ion-exchanged water was added to adjust the pigment content, giving pigment dispersion liquids 1 to 15. The lower rows in Table 2 show the pigment contents and the resin contents in the pigment dispersion liquids.

(Pigment Dispersion Liquid 16)

A solution prepared by dissolving 5.0 g of concentrated hydrochloric acid in 5.5 g of water was cooled to 5° C., and 1.5 g of 4-aminophthalic acid (treatment agent) was added to the cooled solution. A container containing the solution was placed in an ice bath, and to the solution stirred to maintain the temperature at 10° C. or less, a solution prepared by dissolving 1.8 g of sodium nitrite in 9.0 g of ion-exchanged water at 5° C. was added. After stirring for 15 minutes, 6.0 g of the pigment 1 was added under stirring, and the whole was further stirred for 15 minutes to give a slurry. The obtained slurry was filtered through a filter paper (trade name "Standard filter paper No. 2", manufactured by ADVANTEC). The particles were thoroughly washed with water and dried in an oven at 110° C. The counter ions were changed from sodium ions to potassium ions by an ion exchange method, giving a self-dispersible pigment. An appropriate amount of ion-exchanged water was then added to adjust the content of the pigment, giving a pigment dispersion liquid 16 having a pigment content of 10.0%.

(Pigment Dispersion Liquid 17)

First, 10.0 g of the self-dispersible pigment obtained in the preparation of the pigment dispersion liquid 16, 15.0 g of the above-prepared liquid containing the resin dispersant 1 and 75.0 g of ion-exchanged water were mixed. The mixture was thoroughly stirred to give a pigment dispersion liquid 17 having a pigment content of 10.0% and a resin content of 3.0%.

TABLE 2

| Preparation conditions and properties of pigment dispersion liquids | | | | | | | | | | | | | | | |
|---|---|---|---|---|---|---|---|---|---|---|---|---|---|---|---|
| | Pigment dispersion liquid | | | | | | | | | | | | | | |
| | 1 | 2 | 3 | 4 | 5 | 6 | 7 | 8 | 9 | 10 | 11 | 12 | 13 | 14 | 15 |
| Pigment 1 | 10.0 | 10.0 | | | | | | | | | | | | | |
| Pigment 2 | | | 10.0 | | | | | | | | | | | | |
| Pigment 3 | | | | 10.0 | | | | | | | | | | | |
| Pigment 4 | | | | | 10.0 | | | | | | | | | | |
| Pigment 5 | | | | | | 10.0 | | | | | | | | | |
| Pigment 6 | | | | | | | 10.0 | | | | | | | | |
| Pigment 7 | | | | | | | | | | | | | 10.0 | | |
| Pigment 8 | | | | | | | | | | | | | | 10.0 | |
| Pigment 9 | | | | | | | | | | | | | | | 10.0 |
| C.I. Pigment Red 122 | | | | | | | | 10.0 | | | 3.0 | | | | |
| C.I. Pigment Violet 19 | | | | | | | | | 10.0 | | 7.0 | 7.0 | | | |
| C.I. Pigment Red 202 | | | | | | | | | | 10.0 | | 3.0 | | | |
| Liquid containing resin dispersant 1 | 15.0 | | 15.0 | 15.0 | 15.0 | 15.0 | 15.0 | 15.0 | 15.0 | 15.0 | 15.0 | 15.0 | 15.0 | 15.0 | 15.0 |
| Liquid containing resin dispersant 2 | | 15.0 | | | | | | | | | | | | | |
| Ion-exchanged water | 75.0 | 75.0 | 75.0 | 75.0 | 75.0 | 75.0 | 75.0 | 75.0 | 75.0 | 7.5 | 75.0 | 75.0 | 75.0 | 75.0 | 75.0 |
| Pigment content (%) | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Resin content (%) | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |

<Synthesis of Urethane Resin>

A four-necked flask equipped with a stirrer, a thermometer, a nitrogen gas inlet tube and a reflux condenser was prepared. In the four-necked flask, a polyisocyanate, a polyol having no acid group and some of a polyol having an acid group (amount a) in types and amounts shown in Table 3 and 200.0 parts of methyl ethyl ketone were placed. The mixture was then reacted at 80° C. for 6 hours in a nitrogen gas atmosphere. Next, a chain extender and the remainder (amount b) of the polyol having an acid group in types and amounts shown in Table 3 and 100.0 parts of methyl ethyl ketone were added. The mixture was reacted at 80° C. until the residual proportion of an isocyanate group determined by FT-IR reached an intended value, giving a reaction liquid. The resulting reaction liquid was cooled to 40° C., then ion-exchanged water was added, and an aqueous solution of a neutralizer shown in Table 3 was added while the mixture was stirred at a high speed with a homomixer, giving a liquid. From the resulting liquid, methyl ethyl ketone was distilled off under heat and reduced pressure, giving a liquid containing one of urethane resins 1 to 10 at a urethane resin content (solid content) of 20.0%. When potassium hydroxide was used as the neutralizer, the amount was an equivalent molar amount to the acid value of the urethane resin. When triethanolamine was used as the neutralizer, the amount was such an amount as to give a triethanolamine content of 0.3% in an ink in the preparation of the ink described later. In addition, potassium hydroxide was used so that the total amount of triethanolamine and potassium hydroxide would be an equivalent molar amount to the acid value of the urethane resin. Each of the obtained urethane resins 1 to 10 was water-soluble. The components in Table 3 are shown below in detail.

IPDI: isophorone diisocyanate
HDI: hexamethylene diisocyanate
PPG: polypropylene glycol (number-average molecular weight: 2,000)
PTMG: polytetramethylene glycol (number-average molecular weight: 2,000)
DMPA: dimethylolpropionic acid
EDA: ethylenediamine <Properties of Urethane Resin>

Various physical property values of the prepared urethane resins were determined by the following methods.

(Acid Value)

Hydrochloric acid was added to a liquid containing a urethane resin to precipitate the urethane resin. The resin dried under vacuum at 40° C. overnight was dissolved in tetrahydrofuran to prepare a sample. The sample was subjected to potentiometric titration using a potassium hydroxide-methanol titration solution to determine the acid value of the urethane resin. As a result, each of the urethane resins 1 to 10 had an acid value of 90 mg KOH/g.

(Weight-Average Molecular Weight)

The weight-average molecular weight of a urethane resin was determined by gel permeation chromatography (GPC). As a result, each of the urethane resins 1 to 10 had a weight-average molecular weight of 15,000 in terms of polystyrene.

(Proportion of Unit Derived from Polyol Having Acid Group Present at Molecular Terminal)

Hydrochloric acid was added to a liquid containing a urethane resin to precipitate the urethane resin. The dried resin was dissolved in deuterated DMSO to prepare a measurement sample. The prepared sample was analyzed by $^{13}$C-NMR (apparatus name "Avance 500", manufactured by BRUKER Bio Spin). The proportion of the integrated value of the peak of the carbonyl carbon in the unit derived from a polyol having an acid group present at the molecular terminal relative to the total integrated value of the peaks of the carbonyl carbons in the units derived from a polyol having an acid group was calculated. The value (proportion) calculated as above was regarded as the "proportion of the unit derived from the polyol having an acid group present at the molecular terminal". For example, when DMPA is used, the peak of the carbonyl carbon in the unit derived from the polyol having an acid group present at the molecular terminal is detected around 176 ppm, which may slightly vary depending on measurement conditions. The peak of the carbonyl carbon in the unit derived from the polyol having an acid group present in the molecule is detected around 175 ppm. The results are shown in Table 3 as "proportion of terminal acid group (%)".

(Proportion of Urethane Bond)

Hydrochloric acid was added to a liquid containing a urethane resin to precipitate the urethane resin. The dried resin was dissolved in deuterated DMSO to prepare a measurement sample. The prepared sample was analyzed by $^{13}$C-NMR (apparatus name "Avance 500", manufactured by BRUKER Bio Spin), and from the obtained integrated values of the peaks of a urethane bond and a urea bond, the proportion of the urethane bond in the urethane resin was calculated. For example, in the case of a urethane resin prepared from isophorone diisocyanate, the peak of the urethane bond is detected around 155 ppm, which may slightly vary depending on measurement conditions or the formulation of a urethane resin. The peak of the urea bond is detected around 158 ppm. The results are shown in Table 3.

TABLE 3

Synthetic conditions and properties of urethane resins

| | Synthetic conditions | | | | | | | | | Properties | Properties Proportion |
|---|---|---|---|---|---|---|---|---|---|---|---|
| | Polyisocyanate | | Polyol having no acid group | | Polyol having an acid group | | | Chain extender | | | Proportion of terminal | of urethane |
| Urethane resin | Type | Amount (parts) | Type | Amount (parts) | Type | Amount a (parts) | Amount b (parts) | Type | Amount (parts) | Neutralizer | acid group (%) | bond (% by mole) |
| 1 | IPDI | 41.7 | PPG | 36.2 | DMPA | 18.2 | 3.3 | EDA | 0.6 | Potassium hydroxide | 15 | 95.0 |
| 2 | IPDI | 41.7 | PPG | 36.2 | DMPA | 18.2 | 3.3 | EDA | 0.6 | Triethanolamine | 15 | 95.0 |
| 3 | IPDI | 41.7 | PPG | 36.2 | DMPA | 20.5 | 1.0 | EDA | 0.6 | Potassium hydroxide | 5 | 95.0 |
| 4 | IPDI | 41.7 | PPG | 36.2 | DMPA | 15.0 | 6.5 | EDA | 0.6 | Potassium hydroxide | 30 | 95.0 |
| 5 | IPDI | 41.7 | PPG | 36.2 | DMPA | 14.0 | 7.5 | EDA | 0.6 | Potassium hydroxide | 35 | 95.0 |
| 6 | HDI | 48.4 | PPG | 29.5 | DMPA | 18.2 | 3.3 | EDA | 0.6 | Potassium hydroxide | 15 | 95.0 |
| 7 | IPDI | 41.7 | PTMG | 36.2 | DMPA | 18.2 | 3.3 | EDA | 0.6 | Potassium hydroxide | 15 | 95.0 |
| 8 | IPDI | 46.0 | PPG | 30.6 | DMPA | 18.2 | 3.3 | EDA | 1.9 | Potassium hydroxide | 15 | 85.0 |

TABLE 3-continued

Synthetic conditions and properties of urethane resins

| | Synthetic conditions | | | | | | | | | | Properties Proportion of terminal acid group (%) | Properties Proportion of urethane bond (% by mole) |
|---|---|---|---|---|---|---|---|---|---|---|---|---|
| | Polyisocyanate | | Polyol having no acid group | | Polyol having an acid group | | | Chain extender | | | | |
| Urethane resin | Type | Amount (parts) | Type | Amount (parts) | Type | Amount a (parts) | Amount b (parts) | Type | Amount (parts) | Neutralizer | | |
| 9 | IPDI | 46.3 | PPG | 30.1 | DMPA | 18.2 | 3.3 | EDA | 2.1 | Potassium hydroxide | 15 | 84.0 |
| 10 | HDI | 36.0 | PTMG | 40.4 | DMPA | 12.9 | 8.6 | EDA | 2.1 | Potassium hydroxide | 40 | 84.0 |

<Preparation of Ink>

Examples 1 to 21, Reference Examples 1 to 5, Comparative Examples 1 to 13

Components (unit: %) shown in middle rows in Table 4 were mixed and thoroughly stirred, and the mixtures were subjected to pressure filtration through a membrane filter with a pore size of 2.5 μm (trade name "HDCII Filter", manufactured by Pall), giving inks. In Tables 4-1 to 4-3, "Acetylenol E100" is the trade name of a nonionic surfactant (ethylene oxide adduct of acetylene glycol) manufactured by Kawaken Fine Chemicals.

TABLE 4

Formulations and properties of inks

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Pigment dispersion liquid number | 1 | 2 | 3 | 1 | 1 | 4 | 5 | 6 | 7 | 1 | 1 | 1 | 1 |
| Urethane resin number | 1 | 1 | 1 | 2 | 3 | 1 | 1 | 1 | 1 | 4 | 5 | 6 | 7 |
| Pigment dispersion liquid | 40.0 | 40.0 | 40.0 | 40.0 | 40.0 | 40.0 | 40.0 | 40.0 | 40.0 | 40.0 | 40.0 | 40.0 | 40.0 |
| Liquid containing urethane resin | 5.0 | 5.0 | 5.0 | 5.0 | 5.0 | 5.0 | 5.0 | 5.0 | 5.0 | 5.0 | 5.0 | 5.0 | 5.0 |
| Triethanolamine | 0.3 | 0.3 | 0.3 | | 0.3 | 0.3 | 0.3 | 0.3 | 0.3 | 0.3 | 0.3 | 0.3 | 0.3 |
| Diethanolamine | | | | | | | | | | | | | |
| 10% Aqueous sodium hydroxide solution | | | | | | | | | | | | | |
| Glycerol | 9.0 | 9.0 | 9.0 | 9.0 | 9.0 | 9.0 | 9.0 | 9.0 | 9.0 | 9.0 | 9.0 | 9.0 | 9.0 |
| Triethylene glycol | 5.0 | 5.0 | 5.0 | 5.0 | 5.0 | 5.0 | 5.0 | 5.0 | 5.0 | 5.0 | 5.0 | 5.0 | 5.0 |
| Acetylenol E100 | 1.0 | 1.0 | 1.0 | 1.0 | 1.0 | 1.0 | 1.0 | 1.0 | 1.0 | 1.0 | 1.0 | 1.0 | 1.0 |
| Ion-exchanged water | 39.7 | 39.7 | 39.7 | 40.0 | 39.7 | 39.7 | 39.7 | 39.7 | 39.7 | 39.7 | 39.7 | 39.7 | 39.7 |
| Alkanolamine content A (%) | 0.3 | 0.3 | 0.3 | 0.0 | 0.3 | 0.3 | 0.3 | 0.3 | 0.3 | 0.3 | 0.3 | 0.3 | 0.3 |
| Pigment content P (%) | 4.0 | 4.0 | 4.0 | 4.0 | 4.0 | 4.0 | 4.0 | 4.0 | 4.0 | 4.0 | 4.0 | 4.0 | 4.0 |
| Urethane resin content U (%) | 1.0 | 1.0 | 1.0 | 1.0 | 1.0 | 1.0 | 1.0 | 1.0 | 1.0 | 1.0 | 1.0 | 1.0 | 1.0 |
| U/P (times) | 0.25 | 0.25 | 0.25 | 0.25 | 0.25 | 0.25 | 0.25 | 0.25 | 0.25 | 0.25 | 0.25 | 0.25 | 0.25 |
| A/U (times) | 0.30 | 0.30 | 0.30 | 0.00 | 0.30 | 0.30 | 0.30 | 0.30 | 0.30 | 0.30 | 0.30 | 0.30 | 0.30 |

| | Example | | | | | | | | Reference Example | | | | |
|---|---|---|---|---|---|---|---|---|---|---|---|---|---|
| | 14 | 15 | 16 | 17 | 18 | 19 | 20 | 21 | 1 | 2 | 3 | 4 | 5 |
| Pigment dispersion liquid number | 1 | 1 | 1 | 1 | 1 | 1 | 1 | 5 | 8 | 9 | 10 | 11 | 12 |
| Urethane resin number | 8 | 9 | 1 | 1 | 1 | 1 | 1 | 10 | 1 | 1 | 1 | 1 | 1 |
| Pigment dispersion liquid | 40.0 | 40.0 | 40.0 | 40.0 | 40.0 | 40.0 | 40.0 | 40.0 | 40.0 | 40.0 | 40.0 | 40.0 | 40.0 |
| Liquid containing urethane resin | 5.0 | 5.0 | 1.0 | 2.0 | 20.0 | 22.0 | 5.0 | 1.0 | 5.0 | 5.0 | 5.0 | 5.0 | 5.0 |
| Triethanolamine | 0.3 | 0.3 | 0.3 | 0.3 | 0.3 | 0.3 | | | | | | | |
| Diethanolamine | | | | | | | 0.3 | | | | | | |
| 10% Aqueous sodium hydroxide solution | | | | | | | | 0.3 | | | | | |
| Glycerol | 9.0 | 9.0 | 9.0 | 9.0 | 9.0 | 9.0 | 9.0 | 9.0 | 9.0 | 9.0 | 9.0 | 9.0 | 9.0 |
| Triethylene glycol | 5.0 | 5.0 | 5.0 | 5.0 | 5.0 | 5.0 | 5.0 | 5.0 | 5.0 | 5.0 | 5.0 | 5.0 | 5.0 |
| Acetylenol E100 | 1.0 | 1.0 | 1.0 | 1.0 | 1.0 | 1.0 | 1.0 | 1.0 | 1.0 | 1.0 | 1.0 | 1.0 | 1.0 |
| Ion-exchanged water | 39.7 | 39.7 | 43.7 | 42.7 | 24.7 | 22.7 | 39.7 | 43.7 | 40.0 | 40.0 | 40.0 | 40.0 | 40.0 |
| Alkanolamine content A (%) | 0.3 | 0.3 | 0.3 | 0.3 | 0.3 | 0.3 | 0.3 | 0.3 | 0.0 | 0.0 | 0.0 | 0.0 | 0.0 |

TABLE 4-continued

| | colspan="13" | Formulations and properties of inks |
|---|---|---|---|---|---|---|---|---|---|---|---|---|
| Pigment content P (%) | 4.0 | 4.0 | 4.0 | 4.0 | 4.0 | 4.0 | 4.0 | 4.0 | 4.0 | 4.0 | 4.0 | 4.0 | 4.0 |
| Urethane resin content U (%) | 1.0 | 1.0 | 0.2 | 0.4 | 4.0 | 4.4 | 1.0 | 0.2 | 1.0 | 1.0 | 1.0 | 1.0 | 1.0 |
| U/P (times) | 0.25 | 0.25 | 0.05 | 0.10 | 1.00 | 1.10 | 0.25 | 0.05 | 0.25 | 0.25 | 0.25 | 0.25 | 0.25 |
| A/U (times) | 0.30 | 0.30 | 1.50 | 0.75 | 0.08 | 0.07 | 0.30 | 1.50 | 0.00 | 0.00 | 0.00 | 0.00 | 0.00 |

| | colspan="13" | Comparative Example |
|---|---|---|---|---|---|---|---|---|---|---|---|---|
| | 1 | 2 | 3 | 4 | 5 | 6 | 7 | 8 | 9 | 10 | 11 | 12 | 13 |
| Pigment dispersion liquid number | 8 | 9 | 10 | 11 | 12 | 13 | 14 | 15 | 16 | 17 | 1 | 1 | 1 |
| Urethane resin number | 1 | 1 | 1 | 1 | 1 | 1 | 1 | 1 | 1 | 1 | 1 | 1 | — |
| Pigment dispersion liquid | 40.0 | 40.0 | 40.0 | 40.0 | 40.0 | 40.0 | 40.0 | 40.0 | 40.0 | 40.0 | 40.0 | 40.0 | 40.0 |
| Liquid containing urethane resin | 5.0 | 5.0 | 5.0 | 5.0 | 5.0 | 5.0 | 5.0 | 5.0 | 5.0 | 5.0 | 5.0 | 5.0 | |
| Triethanolamine | 0.3 | 0.3 | 0.3 | 0.3 | 0.3 | 0.3 | 0.3 | 0.3 | 0.3 | 0.3 | | | 0.3 |
| Diethanolamine | | | | | | | | | | | | | |
| 10% Aqueous sodium hydroxide solution | | | | | | | | | | | | 0.3 | |
| Glycerol | 9.0 | 9.0 | 9.0 | 9.0 | 9.0 | 9.0 | 9.0 | 9.0 | 9.0 | 9.0 | 9.0 | 9.0 | 9.0 |
| Triethylene glycol | 5.0 | 5.0 | 5.0 | 5.0 | 5.0 | 5.0 | 5.0 | 5.0 | 5.0 | 5.0 | 5.0 | 5.0 | 5.0 |
| Acetylenol E100 | 1.0 | 1.0 | 1.0 | 1.0 | 1.0 | 1.0 | 1.0 | 1.0 | 1.0 | 1.0 | 1.0 | 1.0 | 1.0 |
| Ion-exchanged water | 39.7 | 39.7 | 39.7 | 39.7 | 39.7 | 39.7 | 39.7 | 39.7 | 39.7 | 39.7 | 39.7 | 40.0 | 44.7 |
| Alkanolamine content A (%) | 0.3 | 0.3 | 0.3 | 0.3 | 0.3 | 0.3 | 0.3 | 0.3 | 0.3 | 0.3 | 0.0 | 0.0 | 0.3 |
| Pigment content P (%) | 4.0 | 4.0 | 4.0 | 4.0 | 4.0 | 4.0 | 4.0 | 4.0 | 4.0 | 4.0 | 4.0 | 4.0 | 4.0 |
| Urethane resin content U (%) | 1.0 | 1.0 | 1.0 | 1.0 | 1.0 | 1.0 | 1.0 | 1.0 | 1.0 | 1.0 | 1.0 | 1.0 | 0.0 |
| U/P (times) | 0.25 | 0.25 | 0.25 | 0.25 | 0.25 | 0.25 | 0.25 | 0.25 | 0.25 | 0.25 | 0.25 | 0.25 | 0.00 |
| A/U (times) | 0.30 | 0.30 | 0.30 | 0.30 | 0.30 | 0.30 | 0.30 | 0.30 | 0.30 | 0.30 | 0.00 | 0.00 | — |

Comparative Example 14

An ink of Comparative Example 14 was prepared in accordance with the formulation of Example 1 in Japanese Patent Application Laid-Open No. H10-219166. The synthesized quinacridone solid solution pigment SP-1 was a solid solution of C.I. Pigment Red 122 and C.I. Pigment Violet 19, and the proportion of C.I. Pigment Red 122 was 50% in the solid solution. The formulation of the ink of Comparative Example 14 is as shown below.
  Quinacridone solid solution pigment SP-1: 5.0%
  Styrene-acrylic resin (trade name "Joncryl J-61J", manufactured by BASF): 8.4%
  Isopropanol: 2.5%
  Ethylene glycol: 5.0%
  Glycerol: 10.0%
  Diethanolamine: 1.5%
  Pure water: 64.6%

Comparative Example 15

An ink of Comparative Example 15 was prepared in accordance with the formulation of Example 13 in Japanese Patent Application Laid-Open No. 2010-180316. The synthesized pigment A was a solid solution of C.I. Pigment Red 122 and C.I. Pigment Violet 19, and the proportion of C.I. Pigment Red 122 was 50% in the solid solution. The acrylic resin was a styrene/n-butyl acrylate/methacrylic acid/polyethylene glycol monomethacrylate copolymer, and was neutralized with potassium hydroxide to be used. The formulation of the ink of Comparative Example 15 is as shown below.
  Pigment A: 2.0%
  Acrylic resin: 1.0%
  Glycerol: 2.5%
  2-Pyrrolidone: 2.5%
  Polyethylene glycol (number-average molecular weight: 1,000): 4.0%
  Acetylenol E100: 0.5%
  Pure water: 87.5%

<Evaluation>

To record images, a modified ink jet recording apparatus (trade name "PIXUS Pro 9500", manufactured by Canon) equipped with a recording head that ejects a liquid by thermal energy was used. An ink cartridge filled with one of the prepared inks was set to the yellow position of the ink jet recording apparatus. In the example, 1/600 inch×1/600 inch was defined as 1 pixel, and the ink application amount to a solid image on a recording medium was 16 ng per pixel. In the present invention, "A" and "B" were regarded as an acceptable level, and "C" was regarded as an unacceptable level based on the following criteria of each evaluation item. The evaluation results are shown in Table 5.

(Dissolution Suppression)

The ejection orifice face of the recording head of the above ink jet recording apparatus was capped to prevent an ink from evaporating and was allowed to stand for 3 months at 60° C. After standing, a rotary pump was used to extract the ink in the flow path of the recording head, and silicon was quantitatively determined by using an ICP emission spectrometer (trade name "SPS5100", manufactured by SII NanoTechnology). The silicon in an ink before standing (initial ink) was also quantitatively determined in a similar manner. From quantitatively determined silicon concentrations, the dissolution suppression was evaluated on the basis of the following criteria.
A: The silicon concentration of an ink after standing was less than 5 times the silicon concentration of an initial ink.
B: The silicon concentration of an ink after standing was 5 times or more and less than 10 times the silicon concentration of an initial ink.

C: The silicon concentration of an ink after standing was 10 times or more the silicon concentration of an initial ink.

(Ejection Stability)

The above ink jet recording apparatus was used to record 19 cm×26 cm solid images on 4,000 A4-size recording media (plain paper, trade name "GF-500", manufactured by Canon). The recording head was then detached from the ink jet recording apparatus, and the inside of the ink flow path was observed under an optical microscope, and the ink ejection stability was evaluated on the basis of the following criteria. When deposits were observed over the entire inside of the ink flow path, the evaluation was stopped at that point.
A: Almost no deposit was observed after recording of 4,000 solid images.
B: A slight deposit was observed after recording of 4,000 solid images.
C: Deposits were observed over the entire inside of the ink flow path after of until recording of 4,000 solid images.

(Glossiness)

The above ink jet recording apparatus was used to record a 2 cm×2 cm solid image (an image with a recording duty of 100%) on a recording medium (trade name "Canon Photo Paper, Plus Glossy, GL-101", manufactured by Canon). The recorded solid image was allowed to stand for a day. Two fluorescent lamps arranged in parallel at an interval of 10 cm were used as observation light sources, and fluorescent light was applied to the image 2 m apart at an angle of 45 degrees (a lighting angle of 45 degrees). The shapes of the fluorescent lamps were projected on the image, then the projected shapes of the fluorescent lamps on the image were visually observed from an angle of 45 degrees (an observation angle of 45 degrees), and the glossiness of the image was evaluated on the basis of the following criteria.
A: The boundary between two projected fluorescent lamps was observed, and the edges were not blurred.
B: The boundary between two projected fluorescent lamps was observed, but the edges were slightly blurred.
C: No boundary between two projected fluorescent lamps was observed.

TABLE 5

| | | Evaluation results | | |
|---|---|---|---|---|
| | | Dissolution suppression | Ejection stability | Glossiness |
| Example | 1 | A | A | A |
| | 2 | A | A | A |
| | 3 | A | A | A |
| | 4 | A | A | A |
| | 5 | A | A | A |
| | 6 | A | A | A |
| | 7 | B | A | A |
| | 8 | A | A | A |
| | 9 | A | A | A |
| | 10 | A | A | A |
| | 11 | B | A | A |
| | 12 | B | A | A |
| | 13 | B | A | A |
| | 14 | A | A | A |
| | 15 | B | B | A |
| | 16 | A | A | B |
| | 17 | A | A | A |
| | 18 | A | A | A |
| | 19 | A | A | B |
| | 20 | A | A | B |
| | 21 | B | B | B |
| Reference Example | 1 | C | A | A |
| | 2 | C | A | A |
| | 3 | C | A | A |
| | 4 | C | A | A |
| | 5 | C | A | A |
| Comparative Example | 1 | C | A | A |
| | 2 | C | A | A |
| | 3 | C | A | A |
| | 4 | C | A | A |
| | 5 | C | A | A |
| | 6 | C | A | A |
| | 7 | C | A | A |
| | 8 | C | A | A |
| | 9 | C | A | A |
| | 10 | C | C | A |
| | 11 | A | A | C |
| | 12 | A | A | C |
| | 13 | C | A | C |
| | 14 | C | A | C |
| | 15 | C | A | C |

When the dissolution suppression degree was compared between Examples 8 and 9, Example 8 had a better result.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045713, filed Mar. 10, 2017, which is hereby incorporated by reference herein in its entirety.

What is claimed is:

1. An aqueous ink for ink jet, the aqueous ink comprising:
a pigment;
a resin dispersant for dispersing the pigment;
an alkanolamine; and
a urethane resin, wherein
the pigment is a solid solution including C.I. Pigment Red 122 and C.I. Pigment Violet 19, and in the solid solution, a proportion (% by mass) of the C.I. Pigment Red 122 is 10% by mass or more to 90% by mass or less based on a total mass of the solid solution.

2. The aqueous ink according to claim 1, wherein in the solid solution, the proportion (% by mass) of the C.I. Pigment Red 122 is 10% by mass or more to 45% by mass or less based on the total mass of the solid solution.

3. The aqueous ink according to claim 1, wherein the urethane resin has a unit derived from a polyisocyanate, a unit derived from a polyol having no acid group and a unit derived from a polyol having an acid group, and a proportion of a unit derived from the polyol having an acid group present at a molecular terminal relative to the whole unit derived from the polyol having an acid group is 30% or less.

4. The aqueous ink according to claim 3, wherein the polyisocyanate is isophorone diisocyanate.

5. The aqueous ink according to claim 3, wherein the polyol having no acid group is a polypropylene glycol.

6. The aqueous ink according to claim 1, wherein in the urethane resin, a proportion of a urethane bond relative to a total amount of a urethane bond and a urea bond is 85.0% by mole or more.

7. The aqueous ink according to claim 1, wherein a content (% by mass) of the urethane resin relative to a content (% by mass) of the pigment in terms of mass ratio is 0.10 times or more to 1.00 time or less.

8. The aqueous ink according to claim 1, wherein the alkanolamine is triethanolamine.

9. An ink cartridge comprising:
an ink; and
an ink storage portion storing the ink,
the ink comprises the aqueous ink according to claim 1.

10. An ink jet recording method comprising:
ejecting an ink from an ink jet recording head to record an image on a recording medium,
the ink comprises the aqueous ink according to claim 1.

* * * * *